Jan. 2, 1951
P. E. GRISWOLD
2,536,927
HOP-PICKING MACHINE
Filed Jan. 19, 1946
2 Sheets-Sheet 1
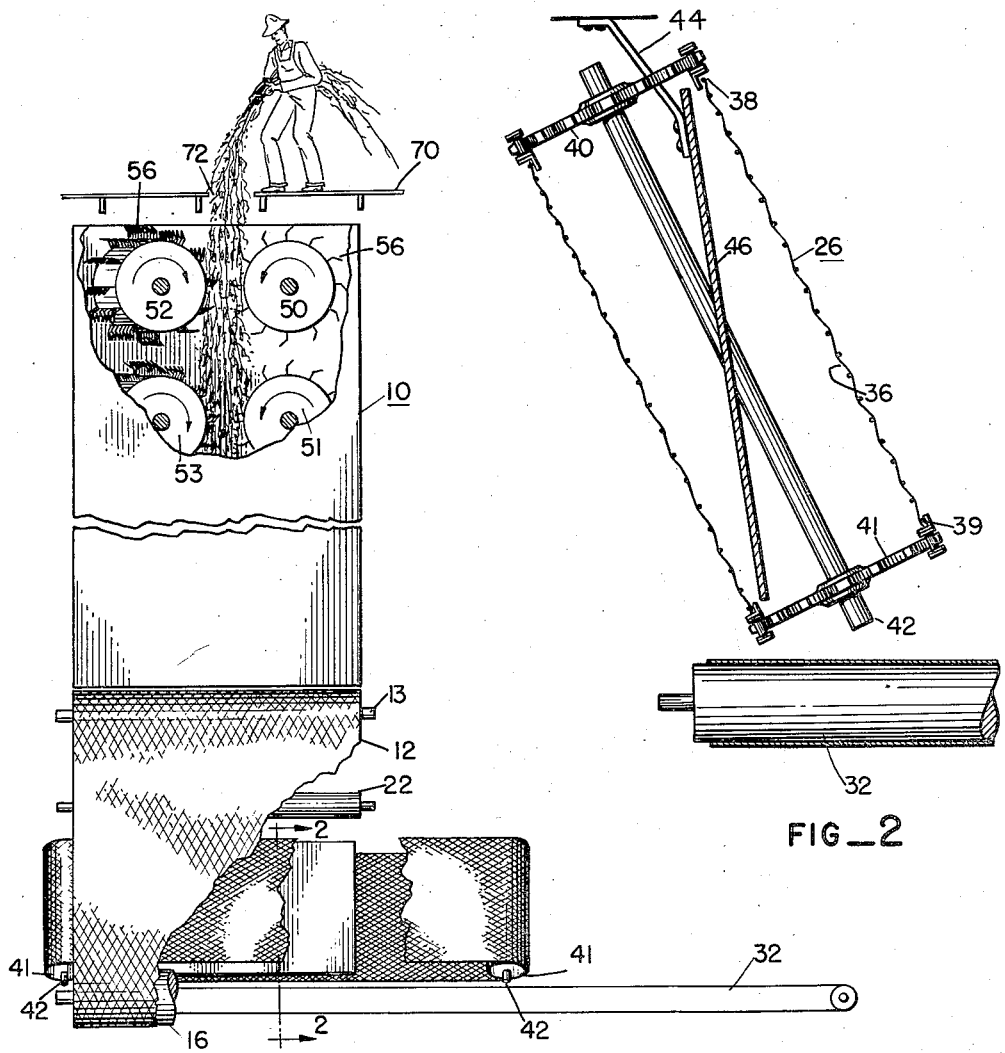
FIG_1
FIG_2
PORTER E. GRISWOLD
INVENTOR
BY *Smith & Juck*
ATTORNEYS Jan. 2, 1951 P. E. GRISWOLD 2,536,927
HOP-PICKING MACHINE
Filed Jan. 19, 1946 2 Sheets-Sheet 2
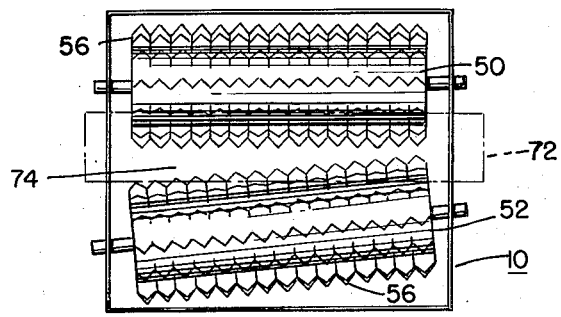
FIG_3
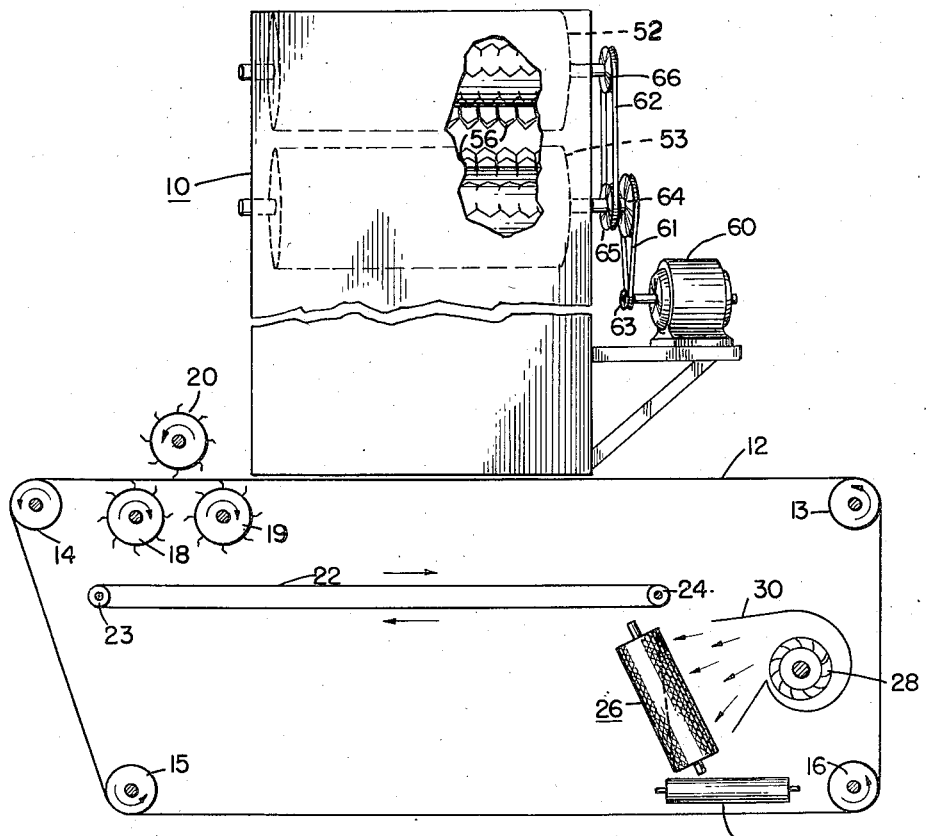
FIG_4
PORTER E. GRISWOLD
INVENTOR
BY
ATTORNEYS Patented Jan. 2, 1951

2,536,927

UNITED STATES PATENT OFFICE 2,536,927

HOP-PICKING MACHINE

Porter E. Griswold, Yakima, Wash.

Application January 19, 1946, Serial No. 642,249

3 Claims. (Cl. 130—30)

1

This invention relates to a hop-picking machine and, more particularly, to a machine for stripping hops from their vines when manually-fed thereto.

Hop-picking has heretofore been largely a matter of employing great amounts of manual labor to hand pick the flowers from the stems and arms, or it has been done by large and expensive machines requiring the investment of much capital and the use of excessive amounts of maintenance labor. In the present stationary machines it is customary to provide horizontal series of rotating drums having picking fingers thereon and to mechanically draw the vine over one such series and between two such series whereby the vine is stripped. Such an operation, left entirely to the mechanism, is without "feel" or judgment and usually results in the production of great quantities of trash intermingled with the hops. Of course, this has to be carefully separated therefrom. Also, because it is common to employ great numbers of these drums, each of which has approximately five hundred picking fingers, there is always much maintenance and repair work required on prior machines because of the many broken fingers that result during a day's operation. In addition, such machines are too large and too expensive for the smaller growers to own or operate, because they are not economically operated unless run to full capacity throughout the whole picking season.

Having these and other well-known defects of the prior art in mind, it is an important object of this invention to provide a hop-picking machine which can be manually fed and which is kinder to the hops and produces less trash in the stripped material.

Another object of this invention is the provision of a hop-picking machine which permits the operator to variably and progressively strip hops with judgment in accordance with conditions as he encounters them when the crop is brought from the fields, in order that the minimum of loading is applied to the machine and its parts during the operation.

Still another object of the invention is to provide, in machine as described, hop-picking elements which will variably accommodate the vines and foliage fed thereto so that longer or shorter picking periods can be had.

A further and more specific object of the invention is the provision, in a machine of the type described, of a first and a second series of hop-picking elements disposed in a substantially horizontal plane but with angular relation to each other, and both movable toward and away from an intermediate upright plane whereby the hop vines may be gravitationally delivered to the picking elements during initial picking and, in a reverse direction, be withdrawn therefrom during final stripping stages of the operation to insure even loading of the picking elements and avoid excessive wear and tear upon the equipment.

The foregoing objects and advantages of the invention and others ancillary thereto I prefer to accomplish as follows:

According to a preferred embodiment of the invention, I provide an upright frame housing within which is mounted opposed picking elements to which, from above, the vines are fed. It is preferable that the picking elements be angularly disposed with relation to each other so that the operators may first feed the full and bushy vine to elements spaced relatively far apart, and then move the vine and its appendages into more restricted areas between the picking elements to complete the picking operation. Specifically, the picking elements comprise V-shaped fingers mounted in series on bars carried by revolving drum heads that are mounted for the application of power. The hops that have been stripped from the vines fall below the picking elements to a conveying and screening means and thence pass to further mechanism for separating the clusters that may have been stripped as a bunch. By the use of suitable separating mechanism and conveying means the hops are moved through a winnow-cleaning process and finally to storage or driers.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawings in which Fig. 1 is an upright schematic view of a mechanism embodying my invention;

Fig. 2 is a cross-sectional view taken on line 2—2 of Fig. 1;

Fig. 3 is a plan view showing the relative arrangement of the picked elements; and Fig. 4 is a side elevational schematic view of the machine of Fig. 1.

A hop-picking machine to overcome the defects hereinbefore mentioned must have at least two totally distinct characteristics; it must be capable of operation with a most simple construction and the minimum of attention; and it must provide satisfactory hop picking with a minimum of damage to the crop and the production of a minimum of trash. Accordingly, a preferred embodiment of the invention, referring to Figures 1 and 3 of the drawings, is constituted by a frame in which is mounted the hop-picking elements. The housing and frame 10 is of right-rectangular cross-section and stands upright above an endless conveyor belt 12 which passes around rollers 13, 14, 15 and 16. The belt is shown as being formed of wire mesh and travels in a right-to-left direction as shown in Fig. 4. One of the rollers, preferably roller 13, has power applied thereto in a conventional manner to cause movement of the belt as indicated. The housing rises from closely adjacent the upper surface of the belt 12.

Picker elements mounted upon revoluble drums 18, 19 and 20 operate upon both sides of belt 12 to break and tear clusters of hops that may have been carried thereto by the belt. The hops fall through the interstices of the belt and are collected by conveyor belt 22 that passes around rollers 23 and 24 in the directions indicated by arrows in Figure 4.

Hops carried by conveyor 22 drop off the end in a cascade that falls toward separator 26 through an air current induced by fan 28 and through its nozzle 30. At this point the hops are separated from the leaves and petals on a screening surface and drop onto the lateral conveyor belt 32 for disposal to storage or additional processing.

The screening surface or separator 26 fully shown in Figures 2 and 4, comprises the endless belt 36 formed of wire mesh of a size in the range of ¼" to ¾" to the openings of the belt. The belt is carried by upper and lower link belts 38 and 39, respectively, which travel on, and are moved by, sprockets as 40 and 41 on shafts 42. The shafts 42 are mounted in suitable bearings and empowered all in a conventional manner to produce continuous movement of the belt 36 in an inclined plane substantially as shown. Between the flights of belt 36 is mounted, by means of bracket 44, a deflector blade or plate 46, which functions as a petal-saver and gathers and directs the petals which escape through belt 36 downward toward the conveyor belt 32 where they are deposited.

As I have mentioned before, the arrangement of the picking elements is an important part of this invention because it simplifies and facilitates both picking and the operation of the machine. The preferred form of these elements is to provide an endless series of picking fingers as is embodied in a picking drum although there are other forms that are equally useful. Within housing 10 I mount for revolution the rollers or drums 50 and 52 in an angular relationship, as shown in Figures 1 and 3, so that their respective axes are non-parallel. The drums are each provided with longitudinally extending rows of V-shaped picking fingers 56 of conventional form well-known in this art. Circumferentially of the drums, the fingers 56 form an endless series of picking elements as the drums are revolved. At one end the drums are positioned close enough together so that the fingers will just about touch during operation, but at the other end the drums are separated to a greater extent. Thus, between the drums there is a V-shaped space 74 into which the vine is fed for stripping.

I have found it advisable to speed the operation to include a second pair of drums 51 and 53 below the others, as can be seen in the drawings. The drums 52, 53 are turned by means such as motor 60 from which power is transmitted through the instrumentality of belts 61 and 62 and the sheaves 63, 64, 65 and 66. Drums 50 and 52 are similarly driven.

Each upper or lower pair of drums is driven so that the fingers 56 or other picking elements are carried in a circular path that is opposite for each drum. The two paths tend to approach, from the top downward, a common plane that is upright therebetween. This is indicated in Figure 1 by suitably placed arrows on the ends of the drums.

Above the drums is a platform 70 having an opening 72 that lies longitudinal of the space 74 between the drums of a pair. An operator standing on this platform manually lowers a vine-end through the opening and into space 74. At the beginning of the operation, when the vine is full and bushy with hops and leaves, he does so at the wider end of space 74. As the fingers 56 strip the hops from the stems and arms of the vine the operator works the vine up and down and progressively moves it into the narrower portions of the V-space 74. In this manner, as the vine reduces in size due to the removal of hops therefrom, it can at all times be kept in contact with the rapidly rotating picking fingers. When the vine has been fully stripped it is raised by the operator and cast aside.

Such hops as are picked from the vine fall below the drums onto and through the meshes of belt 12. If there be clusters deposited upon belt 12 they are carried to picker drums 18, 19 and 20 where they are torn apart and then delivered to conveyor 22.

Such material as is delivered to the screen belt 26 falls through the air from fan 28 onto belt 32. The air currents are usually such that the round and fairly solid hops fall straight down, with but slight contact with belt 26, but the leaves and petals are blown toward the belt. The leaves are held to the moving belt by the air currents and, as they turn the end around sprockets 40, 41, are permitted to fall away and be collected for disposal. The petals pass through the belt and are deflected toward belt conveyor 32.

During vine stripping the operator at all time has both visual and physical contact with the stripping operation and can, thereby, more or less control the manner in which the picking elements have material delivered thereto. If the vines are excessively full and bushy they will be picked longer in the wider portions of picking area 74 and then be moved slowly into the more restricted areas. If lean vines are being brought to the machine the picker may more quickly move into the more restricted areas and thus shorten the time such a vine is in the machine. This materially increases efficiency of picking over that performed by machines where the vine must move through a constant and unvariable path for a fixed and predetermined time period.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. In a hop-picking machine, first and second picking drums having longitudinal rows of V-shaped picking fingers thereon; said picking drums being disposed substantially horizontal and side-by-side with their adjacent rows of picking fingers in progressively greater spaced-apart relationship to each other in a manner that defines an open-end unobstructed, horizontally tapered picking zone in which hop vines, being picked, may be suspended and moved from the wider to the narrower portions of the zone for the performance of the picking operation; means supporting said picking drums in said relationship; and means for rotating said picking drums oppositely so that the paths of travel of the rows of fingers of each drum pass said picking zone from above downward.

2. In a hop-picking machine, first and second picking devices, each having an endless series of V-shaped picking fingers thereon; said picking devices being disposed side-by-side with their respective rows of picking fingers in progressively greater spaced-apart relationship to each other in a manner that defines an open-end, unobstructed, horizontally tapered picking zone when viewed from above in which hop vines, being picked, may be suspended and moved from the wider to the narrower portions of said zone for the performance of the picking operation; means supporting said picking devices in said relationship; and means for actuating said devices so that the rows of picking fingers of each of said devices travel in paths that pass said picking zone from above downward.

3. In a hop-picking machine, first and second picking devices, each having an endless series of rows of V-shaped hop-engaging elements thereon; said picking devices being disposed side-by-side with their respective rows of picking fingers in progressively greater spaced-apart relationship to each other in a manner that defines an open-end, unobstructed, horizontally tapered picking zone when viewed from above in which hop vines, being picked, may be suspended and moved from the wider to the narrower portions of the zone for the performance of the picking operation; means supporting said picking devices in said relationship; and means for actuating said devices so that the rows of V-shaped picking elements of each of said devices travel in paths that pass said picking zone from above downward.

PORTER E. GRISWOLD.

REFERENCES CITED

The following references are of record in the file of this patent:

UNITED STATES PATENTS

| Number | Name | Date |
| --- | --- | --- |
| 120,680 | Whitney et al. | Nov. 7, 1871 |
| 451,063 | Miller | Apr. 28, 1891 |
| 503,190 | Beardsley | Aug. 15, 1893 |
| 526,594 | Weatherbee | Sept. 25, 1894 |
| 541,431 | Easton | June 18, 1895 |
| 595,041 | Butler | Dec. 7, 1897 |
| 925,983 | Benthall | June 22, 1909 |
| 1,008,914 | Horst | Nov. 14, 1911 |
| 1,054,119 | Horst | Feb. 25, 1913 |
| 1,615,981 | James | Feb. 1, 1927 |
| 2,114,727 | Thys | Apr. 19, 1938 |
| 2,138,529 | Thys | Nov. 29, 1938 |
| 2,139,029 | Miller | Dec. 6, 1938 |
| 2,226,206 | McConnel et al. | Dec. 24, 1940 |
| 2,252,159 | Blank | Aug. 12, 1941 |
| 2,336,280 | Miller | Dec. 7, 1943 |